June 29, 1943.  H. HOCKEY ET AL  2,323,221
PORTABLE NOVELTY BANK
Filed Aug. 7, 1941  2 Sheets-Sheet 1
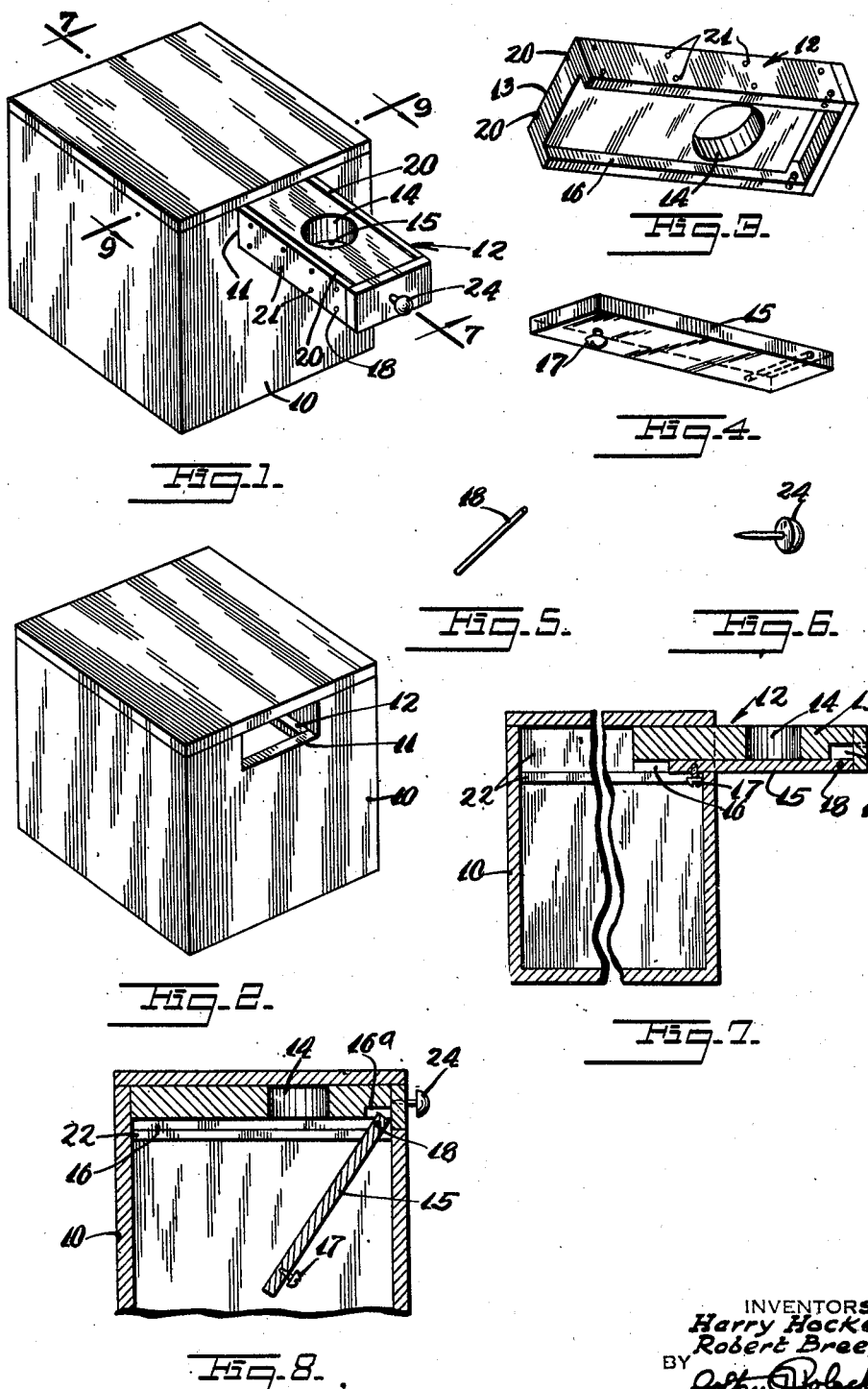
INVENTORS
Harry Hockey
Robert Breen
BY
ATTORNEY June 29, 1943.  H. HOCKEY ET AL  2,323,221
PORTABLE NOVELTY BANK
Filed Aug. 7, 1941  2 Sheets-Sheet 2

INVENTORS
Harry Hockey
Robert Breen
BY
ATTORNEY

Patented June 29, 1943

2,323,221

UNITED STATES PATENT OFFICE 2,323,221

PORTABLE NOVELTY BANK

Harry Hockey, Bronx, and Robert Breen, New York, N. Y.

Application August 7, 1941, Serial No. 405,863

1 Claim. (Cl. 232—55)

This invention relates to new and useful improvements in a portable novelty bank.

The invention specifically relates to a novelty bank having a housing formed with an opening in one wall and a drawer of a specific construction slidably mounted in the opening. It is proposed that the drawer comprise a solid slab having an opening extending through from the top to the bottom at a point between its front and rear ends. A trap door is set into a recess in the bottom of the slab. A novel means is provided, mounted upon the trap door, for limiting the possible extension of the drawer. A novel arrangement is also provided by which the trap door may be separated from the drawer which will then permit the drawer to be completely pulled out. This makes possible the removal of the trap door, and the removal of coins from within the housing.

Another object of the invention is the construction of a device as described which is simple and durable and which may be manufactured and sold at a reasonable cost.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Fig. 1 is a perspective view of a novelty bank constructed in accordance with this invention.

Fig. 2 is a perspective view similar to Fig. 1 but illustrated with the drawer and trap door removed.

Fig. 3 is a bottom perspective view of the drawer.

Fig. 4 is a bottom perspective view of the trap door.

Fig. 5 is a perspective view of a certain pintle which is used to connect the trap door and drawer together.

Fig. 6 is a perspective view of a handle used on the front of the drawer.

Fig. 7 is a fragmentary enlarged vertical sectional view taken on the line 7—7 of Fig. 1.

Fig. 8 is a view similar to Fig. 7 but illustrated with the parts in a different position.

Figure 9:
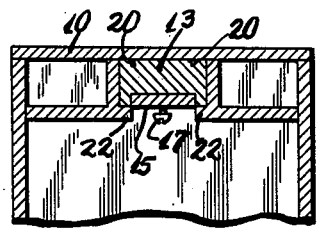
Fig. 9 is a transverse vertical sectional view taken on the line 9—9 of Fig. 1.
Figure 10:
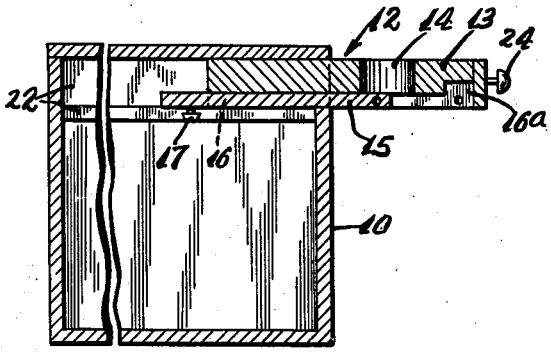
Fig. 10 is a similar view to Fig. 7 showing the trap door in disengaged condition from the drawer.

The novelty bank, in accordance with this invention, includes a coin housing 10 formed with an opening 11 in one wall. In the particular design of bank shown on the drawing this opening is located at the top portion of one of the side walls. A drawer 12 is slidably mounted in and through the opening 11. This drawer comprises a solid slab 13 having an opening 14 extended through from the top to the bottom at a point between its front and rear ends. A trap door 15 is set into a recess 16 formed in the bottom of the slab 13. A stop member 17 is mounted on the rear end of the trap door 15 and is normally disposed within the housing 10 and is adapted to strike the material at the edge portion of the opening 11 for preventing the complete withdrawal of the drawer 12. A pintle 18 pivotally supports the front end of the trap door 15 on said slab 13. This pintle is removable to free the drawer 12 which may then be completely removed from the housing 10.

The housing 10 is in the form of a completely closed box, except for the opening 11. The drawer 12 is camouflaged to conceal the trap door 15. This camouflage consists in several grooves 20 extended along the top of the slab 13 and giving the appearance that the slab is made from several parts which are held together with small brads or nails 21. The parts 21 do not necessarily need to be brads and may merely comprise small recesses and small metal pins engaged in these recesses to simulate the heads of brads. The simulated brads 21 draw attention away from the pintle 18, the ends of which also look like the heads of brads. Consequently, when someone examines the novelty bank with the drawer 12 in an open condition, they will believe it is made from a solid piece with the trap door 15 comprising the bottom, and will not notice that the trap door is movable and may open when the drawer is closed. The recess 16 has an enlarged front portion 16ª into which the front end of the trap door 15 may swing when it falls open, as clearly shown in Fig. 8. When the drawer 12 is pulled open the bottom edge of the opening 11 naturally closes the trap door 15 so that it may not be easily detected as being a trap door.

The interior of the coin housing 10 is provided with track members 22 extended inwards from the sides of the opening 11 and forming a support for the side edges of the slab 13. However, the trap door 15 is sufficiently narrow to be capable of falling down in between the tracks 22. A small tack 24 is mounted on the front of the drawer 12 and forms a handle by which the drawer may be easily opened and closed.

The operation of the novelty bank is as follows:

When the drawer 12 is opened, as illustrated in Fig. 1, a coin may be placed into the opening 15 to rest on the trap door 15. When the drawer 12 is closed the trap door will swing down, as shown in Fig. 8, so that the coin is dropped into the coin housing 10. The coins may be removed by first opening the drawer 12 to the position as shown in Fig. 1; then the pintle 18 is removed. This may be easily accomplished by first removing the tack 24 and using the stem of the tack as an ejecting tool. The stem of the tack 24 may be engaged against one end of the pintle 18 and then the pin may be forced out through the remote side of the drawer 12. When the pintle 18 is removed the front end of the trap door 15 will be free and then the slab 13 may be pulled out from the opening 11. Thereafter the trap door 15 may be lifted upwards so that the stop member 17 passes out from the opening 11. The coins within the coin housing 10 may then be shaken out of the housing.

Figure 11:
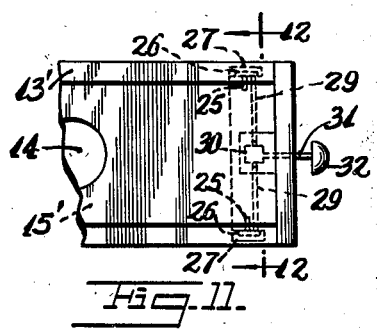
Fig. 11 is a fragmentary plan view of the front portion of a drawer constructed in accordance with a modified form of this invention and intended to be used with the novelty bank.
Figure 12:
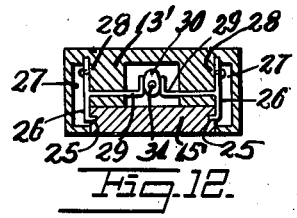
Fig. 12 is a vertical sectional view taken on the line 12—12 of Fig. 11.

In Figs. 11 and 12 a modified form of the invention has been disclosed which distinguishes from the prior form in the means for releasably supporting the front end of the trap door 15' upon the slab 13'. In accordance with this form, the front end of the trap door 15' is pivotally supported by a trunnion consisting of the trunnion elements 25 which engage in small openings in the sides of the trap door 15'. These trunnion elements 25 are supported upon the bottom ends of leaf springs 26. These leaf springs 26 are mounted within cavities 27 formed in the side walls of the slab 13'. The springs 26 are supported at their upper ends by fastening elements 28 so that the lower ends provided with the trunnion elements 25 may be flexed outwards. Stems 29 are connected with the springs 26 and extend towards each other and engage against the sides of a cam 30. This cam 30 is supported upon a stem 31 of a handle which is turnably mounted through the front of the drawer 12. The stem 31 is provided with a head 32 by which it may be easily turned.

Normally, the trunnions 25 pivotally support the trap door 15' so that it may operate in a manner identical to the operation of the trap door in the prior form of the invention. However, when it is desired to free the front of the trap door 15' it is merely necessary to turn the knob 32 through approximately 90°. This turns the cam 30 which forces the stems 29 outwards, flexing the springs 26 outwards and moving the trunnion elements 25 out from the small openings in the sides of the trap door 15'. The trap door is thus released, and is free.

Figure 13:
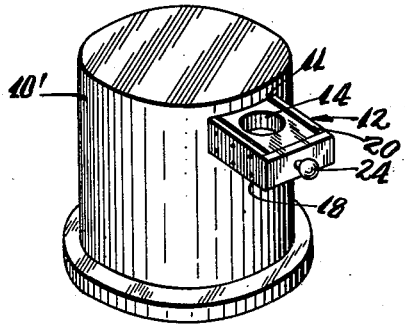
Figs. 13 and 14 are similar views to Fig. 1, but illustrating other forms of the invention.
Figure 14:
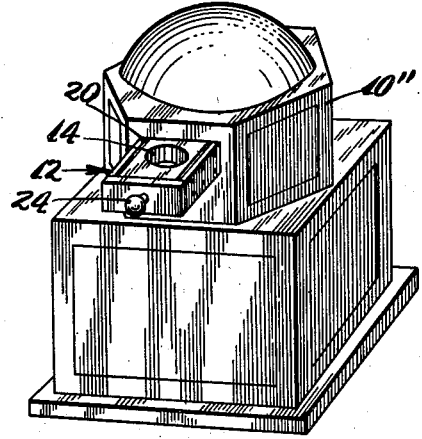

In Fig. 13 a housing 10' is shown to be of cylindrical shape while in Fig. 14 the housing 10'' is of a further modified form. In other respects the drawer constructions 12 of these forms of the invention are similar to the previous forms and the corresponding parts may be recognized by corresponding reference numerals.

It is to be understood that the design, material and proportions of the portable novelty bank may be changed as desired.

While we have illustrated and described the preferred embodiments of our invention, it is to be understood that we do not limit ourselves to the precise constructions herein disclosed and the right is reserved to all changes and modifications coming within the scope of the invention as defined in the appended claim.

Having thus described our invention, what we claim as new, and desire to secure by United States Letters Patent is:

A novelty bank having a coin housing slidably supporting a member with an opening extended therethrough from the top to the bottom and a trap door covering the bottom of said member thereby forming a drawer, leaf springs having their top ends secured to said member adjacent the front end thereof, and trunnion elements extending toward one another formed on the bottom ends of said leaf springs and engaging complementary openings formed in the sides of said trap door pivotally supporting said trap door to pivot relative to said member, whereby when said drawer is within said housing said trap door will pivot downwards permitting a coin placed within said drawer to drop into the interior of said housing, a stop at the rear of said drawer preventing its removal from the housing, and means for spreading said leaf springs to disengage said trunnion elements from their respective openings to free said member comprising a handle rotatively extended into an opening formed in said member, a cam mounted on the inner end of said handle, and stems extending toward one another projecting from said leaf springs and having their inner ends bearing against opposite sides of said cam to be urged outwards, spreading said leaf springs when said handle is turned to effect turning said cam.

HARRY HOCKEY.
ROBERT BREEN.